Patented July 15, 1941

2,249,514

UNITED STATES PATENT OFFICE 2,249,514

FRICTION ELEMENT FOR POWER TRANSMISSION

Herbert Berg, Burghausen, Oberbayern, and Bruno von Zychlinski, Munich, Germany, assignors to Chemische Forschungsgesellschaft m. b. H., Munich, Germany, a corporation of Germany No Drawing. Application December 1, 1937, Serial No. 177,651. In Germany December 17, 1936

9 Claims. (Cl. 74—231)

This invention relates to friction elements for power transmission such as belts, cables, friction couplings, clutch facings and the like. More particularly, it relates to the improvement of the frictional surfaces of such devices.

Frictional power transmission devices, such as driving belts and the like, are usually made from such materials as leather, rubber, textile fabrics and the like. Such belts have certain shortcomings, among which may be mentioned a tendency to become glazed on their friction surfaces, thereby resulting in slippage of the belt with consequent power loss; the fact that they tend to develop cracks and fissures after long continued flexing; the fact that they tend to pick up static electrical charges which, upon discharge, constitute a fire hazard if combustible materials are present in the vicinity; and the fact that oils and greases exert a deleterious action upon them causing slippage and deterioration of the belt material.

It is an object of the present invention to provide improved frictional elements for power transmission which are free from the above mentioned disadvantages. A further object is to provide a method of improving the characteristics of the friction surfaces of frictional power transmission elements. Other objects and advantages of the invention will be apparent from the ensuing description thereof.

The above and related objects are attained, in accordance with the invention, by the utilization of hydrophylic polyvinyl compounds as friction surfaces in power transmission elements of the foregoing types. By hydrophylic polyvinyl compounds, we mean polyvinyl alcohol and such partial derivatives thereof as are collodially soluble or dispersible in water. The partial derivatives of polyvinyl alcohol may be prepared, for example, by the partial hydrolysis or saponification of polymerized vinyl esters, ethers or acetals. Alternatively, they may be prepared by the partial reaction of polyvinyl alcohol with acids, esters or aldehydes. For the purposes of the present invention, the preferred agents are those partial derivatives of polyvinyl alcohol wherein from about 5% to about 35% of the hydroxyl groups have been replaced by ester, ether or acetal groups, leaving from about 95% to 65% of the free hydroxyl groups in the compound.

The frictional elements of the present invention may be conveniently prepared merely by coating or impregnating the usual known types of belts, clutch facings, etc. with a solution of the hydrophylic polyvinyl compound in water or other suitable solvent. Upon removing the solvent, as by drying, either at ordinary or elevated temperatures, a film of the hydrophylic polyvinyl compound is deposited. Alternatively, a sheet or film of the hydrophylic vinyl compound may be prepared separately and adhesively united to the surface of the belt or other frictional element. In certain cases, the element may be composed predominately or entirely of the hydrophylic polyvinyl compound, which may be moulded or extruded, by known methods, to the desired form. In such cases, it is sometimes desirable to incorporate in the element intercalations of textile fibers, metal foils or the like. Fillers such as starch, gelatine and the like may also be included, as well as various plasticizers such as glycerine, glycols, formamide, sulfocyanides and the like.

Although the hydrophylic polyvinyl compounds utilized in the present invention are soluble or capable of swelling in water, they are not unduly water-sensitive for most purposes. However, if it is desired to decrease their water-sensitivity, they may be treated with various insolubilizing agents. Examples of suitable insolubilizing agents are: aldehydes, certain metal salts, such as dichromates and iron salts, and dye-stuffs of the Congo red group. The water-sensitivity may also be decreased by heating the compositions or by treatment with dehydrating agents, particularly with alcohols such as methyl or ethyl alcohol which have an affinity for water.

Driving belts and other frictional devices made in accordance with the present invention possess a number of advantages. They show much less tendency to slip on driving members, particularly after long continued use, than do similar belts, etc. made from leather, textiles or rubber. They show no tendency to develop electrostatic charges under any conditions. They are entirely impervious to, and unaffected by, oils and greases. One of their most important characteristics is their extremely high resistance to repeated bending and flexing stresses. This effect is of particular importance in the case of high speed belts running over pulleys of small diameter, the flexing stresses being particularly severe under these circumstances. Moreover, if belts made in accordance with the invention do become superficially damaged, for example, at the edges, any cracks or fissures which are formed do not tend to grow or extend over further areas of the belt surface, as is the case with most types of belts.

Softening agents may be added to the polyvinyl compound. Phosphoric acid or lactic acid etc., if necessary combined with glycerin or mineral oil may be applied with advantage instead of the usual softening agents such as glycerin, mineral oil etc., especially in order to avoid exuding of the softening agent.

It is to be understood that the invention is not restricted to the specific embodiments thereof described hereinabove but includes all such modifications and variations as fall within the scope of the appended claims.

We claim:

1. A frictional power transmission element wherein the friction surfaces comprise a hydrophylic polyvinyl compound.

2. A frictional power transmission element wherein the friction surfaces comprise polyvinyl alcohol.

3. A frictional power transmission element wherein the friction surfaces comprise a partial derivative of polyvinyl alcohol wherein from about 5% to about 35% of the hydroxyl radicals have been substituted by radicals selected from the group consisting of ester, ether and acetal radicals.

4. A power transmission belt comprising a hydrophylic polyvinyl compound.

5. A power transmission belt comprising polyvinyl alcohol.

6. A power transmission belt comprising a partial derivative of polyvinyl alcohol wherein from about 5% to about 35% of the hydroxyl radicals have been substituted by radicals selected from the group consisting of ester, ether and acetal radicals.

7. An improved frictional power transmission element having a high coefficient of friction on driving members, being resistant to the development of electrostatic charges, and having a friction surface which comprises a hydrophylic polyvinyl compound.

8. An improved frictional power transmission element having a high coefficient of friction on driving members, being resistant to the development of electrostatic charges, and having a friction surface which comprises a polyvinyl alcohol.

9. An improved frictional power transmission element having a high coefficient of friction on driving members, being resistant to the development of electrostatic charges, and having a friction surface which comprises a partial derivative of polyvinyl alcohol wherein from about 5% to 35% of the hydroxyl radicals have been substituted by radicals selected from the group consisting of ester, ether, and acetal radicals.

HERBERT BERG,
BRUNO V. ZYCHLINSKI.